United States Patent [19]

Sato

[11] Patent Number: 5,172,359
[45] Date of Patent: Dec. 15, 1992

[54] SYSTEM FOR RECORDING DIGITAL DATA

[75] Inventor: Hideaki Sato, Yokohama, Japan

[73] Assignee: Canon Kabushiki Kaisha, Tokyo, Japan

[21] Appl. No.: 263,231

[22] Filed: Oct. 27, 1988

[30] Foreign Application Priority Data

Oct. 30, 1987 [JP] Japan .................. 62-275079

[51] Int. Cl.$^5$ .................. G11B 5/09; H04N 5/76
[52] U.S. Cl. .................. 369/59; 360/40; 360/49
[58] Field of Search .................. 369/59; 360/40, 47; 356/261.1

[56] References Cited

U.S. PATENT DOCUMENTS

| | | | |
|---|---|---|---|
| 4,549,167 | 10/1985 | Kato et al. | 360/40 |
| 4,558,441 | 12/1985 | Yokota et al. | 369/59 |
| 4,860,324 | 8/1989 | Satomura | 341/59 |

FOREIGN PATENT DOCUMENTS

| | | |
|---|---|---|
| 213623 | 3/1987 | European Pat. Off. . |
| 289004 | 11/1988 | European Pat. Off. . |
| 60-140544 | 12/1985 | Japan . |

OTHER PUBLICATIONS

Topical Meeting On Optical Data Storage, Stateline, Nevada, Mar. 11-13, 1987, pp. 106-110, Optical Society of America.
"Digital optical recording-The case for coding".
Wireless World, vol. 88, No. 1555, Apr. 1982, pp. 77-80, "Disc drives".
IBM Technical Disclosure Bulletin, vol. 27, No. 12, May 1985, pp. 7025-7026, "Write-time compensation for 2,7 code".

*Primary Examiner*—Aristotelis Psitos
*Assistant Examiner*—Varsha V. Sheladia
*Attorney, Agent, or Firm*—Fitzpatrick, Cella, Harper & Scinto

[57] ABSTRACT

There is provided a digital data recording system in which digital data which is encoded by the RLL (Run Length Limited) encoding system in which code "1" does not continue is recorded onto a recording medium in accordance with an NRZL (Non Return to Zero) rule. In this system, the digital data is input, a width of pulse corresponding to code "1" in the input digital data is converted into a pulse of a width larger than the pulse width, and the digital data of the converted pulse width is recorded onto the recording medium. A change amount of the pulse width is made different in accordance with the minimum number of codes "0" arranged between codes "1" and "1" in the digital data. With this system, the error rate of the digital data recorded on the recording medium can be reduced. In the case of the same error rate, the recording density can be improved.

12 Claims, 4 Drawing Sheets

FIG. 1A
FIG. 1B
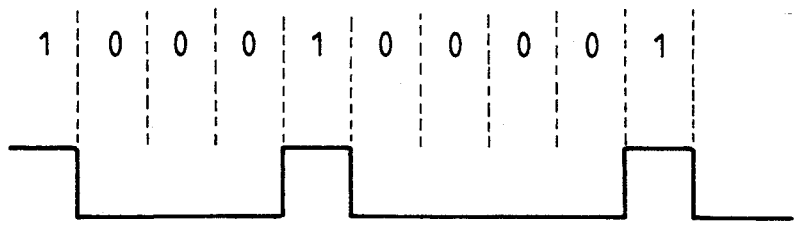
FIG. 2
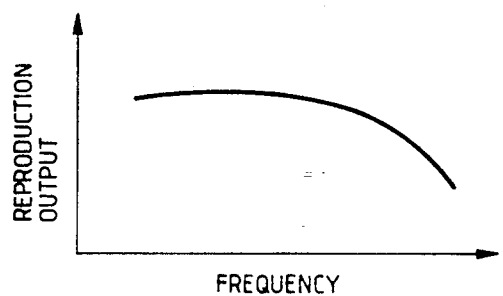
FIG. 3
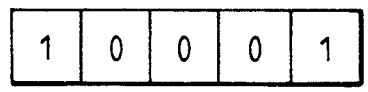
FIG. 4
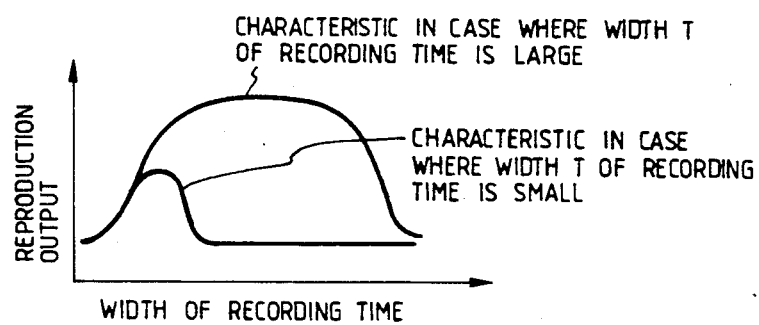

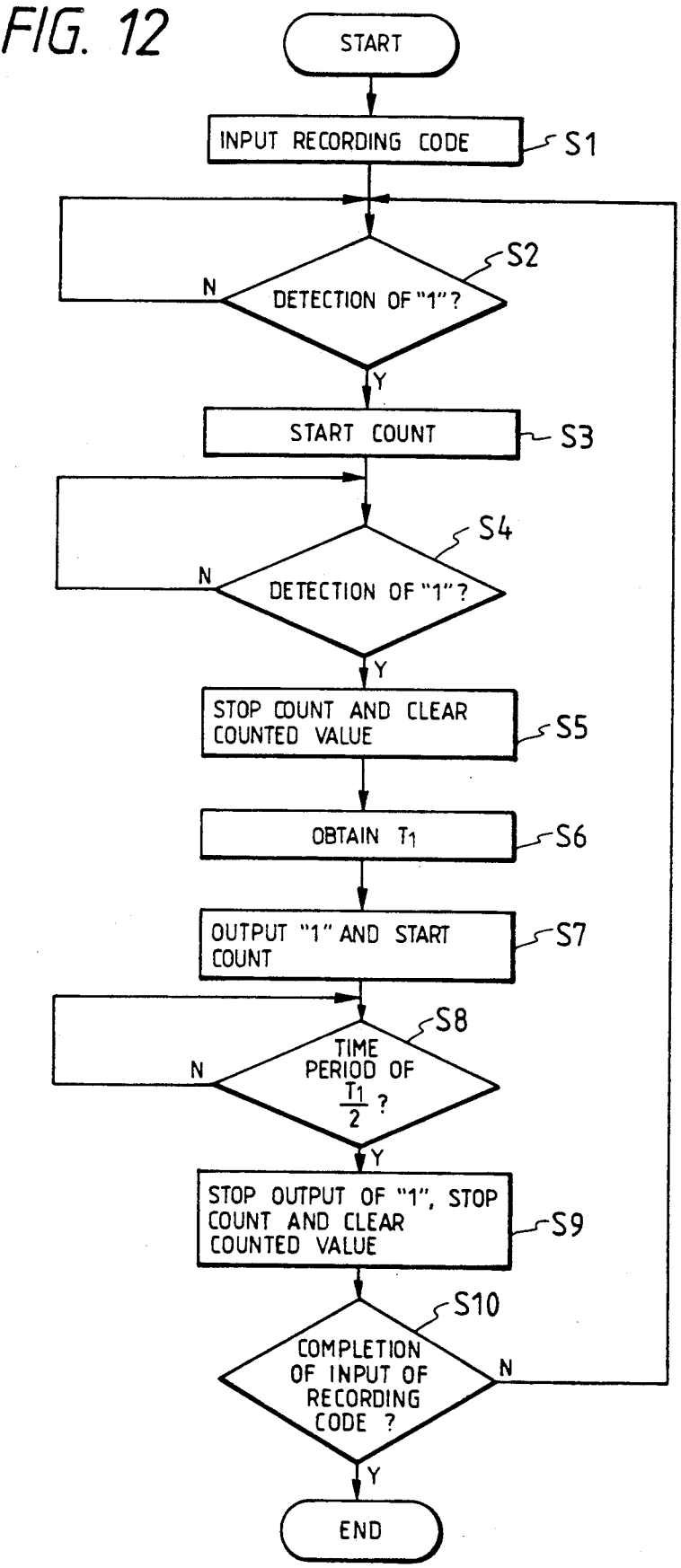

SYSTEM FOR RECORDING DIGITAL DATA

BACKGROUND OF THE INVENTION

1. Field of the Invention

The present invention relates to a recording system for use when digital data is recorded on a recording medium.

2. Related Background Art

As a system for encoding and recording data to be recorded, a system in which an input data series is converted into a Run Length Limited code (hereinafter, referred to as "RLL code") series and recorded in accordance with the NRZL (NRZ) rule has been disclosed in, for example, U.S. Pat. No. 4,860,324.

The NRZL rule refers to a system in which, for instance, when the RLL coded data is as shown in FIG. 1A, this data is converted into a signal as shown in FIG. 1B.

In the case of decoding, an interval between code 1 and code 1, that is, data between marks is decoded.

A recording medium generally has a reproducing characteristic such that response of reproduction output decreases at high frequencies as shown in FIG. 2. Therefore, when a pulse width of a recording signal is narrow, the response decreases.

The RLL codes are generally expressed as d, k, m, and n codes.

In this case, m denotes the number of bits constituting one block of the input data series and n indicates the number of bits of one block of the input data series, after completion of the conversion, in the corresponding RLL code. On the other hand, d represents the minimum number of continuous code bits "0" which is permitted in the RLL codes. When $d \geq 1$, the code bit "1" is not permitted to occur twice in immediate succession. k indicates the maximum number of continuous code bits "0" which is permitted in the RLL code.

In the RLL codes, the case where the values of d and k, particularly the value of d, is relatively large will now be considered. As an example, the case of $d=3$ is shown in FIG. 3.

In this case, when a light source for recording is flickered and recorded on an optical recording medium in accordance with the NRZL rule, particularly, in the case of a high density and a short flickering time of the light source, there could occur such a situation that enough energy is not given to the recording medium and optical recording is not satisfactorily performed. This is because the surface of the medium is changed by the heat to effect the recording, and consequently some minimum irradiation time is needed to assure that recording has occurred.

FIG. 4 shows examples of a change in reproduction output in the case where a width T of recording time is large and a reproduction output in the case where it is small.

Therefore, in the conventional NRZL recording of the RLL codes, there are problems that when the illumination time of the light source is short, reproduction output of a sufficiently high level cannot be obtained and it is difficult to reduce errors of information. In other words, there is a problem that for a given error rate, it is difficult to improve the recording density.

SUMMARY OF THE INVENTION

It is an object of the present invention to eliminate the foregoing drawbacks and to provide an improved system for recording digital data.

Another object of the invention is to provide a system for recording digital data in which the error rate of information recorded on a recording medium can be reduced.

Still another object of the invention is to provide a system for recording digital data in which the recording density can be improved for a given error rate of information.

The above and other objects and features of the present invention will become apparent from the following detailed description of the preferred embodiments with reference to the accompanying drawings.

BRIEF DESCRIPTION OF THE DRAWINGS

FIGS 1A and 1B are diagrams showing RLL codes in accordance with the NRZL rule;

FIG. 2 is a diagram showing a general frequency characteristic of a reproduction output in optical recording;

FIG. 3 is a diagram showing an example of RLL codes;

FIG. 4 is a diagram showing a reproduction output in the case where a width T of recording time is large and a reproduction output in the case where it is small;

FIG. 12 is a flowchart showing processes to convert the time width of code 1.

DETAILED DESCRIPTION OF THE PREFERRED EMBODIMENTS

The preferred embodiments of the present invention will be described hereinbelow with reference to the drawings.

Figure 5:
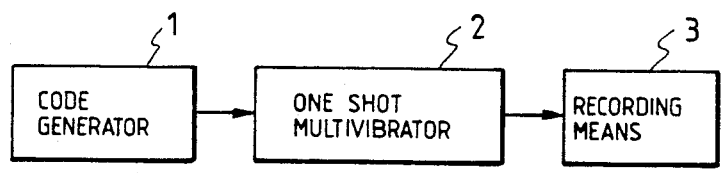
FIG. 5 is a block diagram showing an arrangement of the present invention.

FIG. 5 is a block diagram showing an embodiment of the invention.

A code generator 1 is means for generating RLL codes and outputs the RLL codes corresponding to input data. A one shot multivibrator 2 is an example of means for converting a time width T corresponding to code 1 in the RLL codes into a time width T' longer than the time width T and outputting the result. Recording means 3 records information on a recording medium in accordance with the code in which the time width T has been converted to T'. For instance, a magnetooptic disk apparatus for recording information onto a disk by irradiating a laser beam is used as the recording means 3.

Figure 6A:
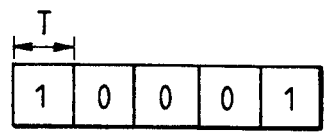
FIGS. 6A and 6B are diagrams showing a signal in a case where the time width of code 1 is converted.
Figure 6B:

FIGS. 6A and 6B are explanatory diagrams of the above embodiment.

It is now assumed that the time width of the code 1 bit in the RLL codes is T and the codes shown in FIG. 6A are output from the code generator 1. The one shot multivibrator 2 converts the time width T of code 1 in the RLL codes into T' and outputs the result. In this case, the time width T' is longer than the time width T.

As will be obvious from FIG. 4, the output of the code having the time width T' is larger than the output of the code having the time width T. As shown in FIG. 6B, the interval between code 1 in FIG. 6A and the next code 1 is equal to an interval between the leading edge of the time width T' and the leading edge of the code of the next time width T'. Therefore, even if the time width of code 1 (high-level pulses) is changed by the multivibrator 2, the content of the information in the RLL codes does not change, because that content is the interval between the leading edges of consecutive coded "1".

Therefore, in the case of using an optical disk apparatus or a magnetooptic disk apparatus as the recording means, an energy sufficiently larger than that obtained when a laser beam is irradiated onto the disk for a time width T, is imparted to the disk, so that the recorded data of code 1 can be read out with certainty and reliability.

Although the one shot multivibrator 2 has been shown in FIG. 5 as means for converting the time width T into the time width T', it can be also converted by other means.

For example, it is sufficient to construct the device in a manner such that when code 1 is input, counting is started in response to the leading edge, using a counter for counting clock pulses, and a high level signal is output until pulses of a number corresponding to the time width T' are counted. On the other hand, it is also possible to start the counting in response to a trailing edge of code 1 and to count the pulses only to number corresponding to the interval (T'−T).

Figure 7A:
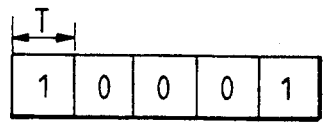
FIGS. 7A and 7B are diagrams showing a signal in a case where the time width of code 1 is converted according to another embodiment.
Figure 7B:

FIGS. 7A and 7B are diagrams for explaining another embodiment of the invention.

Codes shown in FIG. 7A are similar to those shown in FIG. 6A. In the example shown in FIG. 7B, in the case of converting the time width T into T' when d=3, $$T' = (d+1) \times T/2 \quad (1)$$

As the time width T' increases, code 1 can be more easily discriminated but the width of code 0 is reduced. Therefore, there is a possibility that the number of errors may increase in the portion corresponding to code 0 due to this interference between codes.

Figure 8A:
FIG. 8A is a diagram showing a signal which is recorded on a recording medium.
Figure 8B:
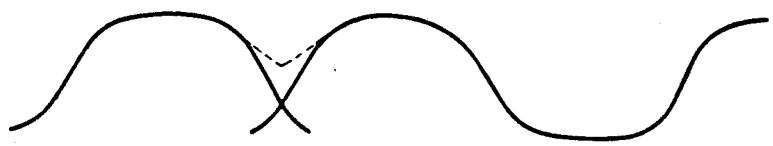
FIG. 8B is a diagram showing an analog reproduction signal of the signal recorded on the recording medium.
Figure 8C:
FIG. 8C is a diagram showing a binarized signal of the analog reproduction signal.

For example in a case where data shown in FIG. 8A has been recorded, when this recorded data is read out of a recording medium, it shows an analog waveform like that shown in FIG. 8B. When the width of the code 0 portion decreases, the edge slope portion of the code 1 portion and the edge slope portion of the analog waveform corresponding to code 1 overlap, so that there occurs a case where a portion which should inherently be 0 is erroneously discriminated as 1 (FIG. 8C).

In general, in one RLL code, the density of code 1 becomes maximum in the case where d codes 0 are arranged between code 1 and the next code 1. In this case, since the width of the code "0" portion becomes minimum, a data error, as described above most easily occurs. Therefore, in such a case, by making the widths of codes 1 and 0 equal (duty factor 50%), the error rates of codes 1 and 0 can be equally reduced. Accordingly, it is desirable to set the time width T' as shown in the equation (1).

In the above embodiment, the duty factor has been set to 50% only when d codes 0 are arranged between code 1 and the next code 1. However, if the duty factor is always set to 50% irrespective of the number of codes 0, the error rates of codes 1 and 0 can be always reduced. A method for doing so will now be described.

Figure 9:
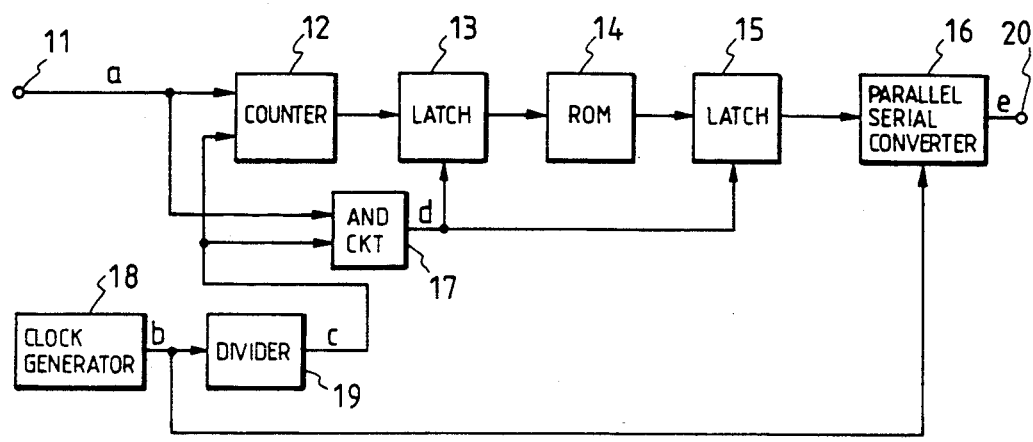
FIG. 9 is a block diagram showing an arrangement of a circuit to convert the time width of code 1.
Figure 10A:
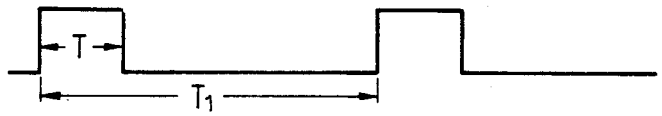
FIGS 10A-10E are diagrams showing a signal in each section of the block diagram of FIG. 9.

FIG. 9 shows a practical embodiment of a time width converting method of the invention. FIG. 10 is a waveform diagram in each section of the circuit of FIG. 9. Reference numeral 11 denotes an input terminal of RLL encoded recording codes. For example, a recording code waveform a shown in FIG. 10A is input to the input terminal 11.

Figure 10B:
Figure 10C:

Reference numeral 18 denotes a clock generator of a bit rate which is twice the bit rate of the recording code. For example, a crystal oscillator is used as the clock generator 18. FIG. 10B shows a waveform diagram of a signal which is generated from the clock generator 18. Reference numeral 19 denotes a ½ frequency divider consisting of a flip-flop circuit for frequency-dividing an output of the clock generator 18 into half the original frequency. FIG. 10C shows a waveform thereof.

Reference numeral 12 denotes a well-known counter. The recording code waveform is input to an enable terminal of this counter. When a low level signal is input to the enable terminal, it is counted. An output c of the frequency divider 19 is input to a count input terminal of the counter 12.

Figure 10D:

An AND circuit 17 provides the AND product of the recording code waveform a and the output c of the frequency divider 19. An output waveform of the AND circuit 17 is shown in FIG. 10D.

A latch circuit 13 latches output data of the counter 12 in response to an output d of the AND circuit 17.

Reference numeral 14 denotes a ROM to decide the time width T'. An output of the latch circuit 13 is input as an address to the ROM 14 and the data corresponding to T' is output.

In this case, assuming that the number of input data is n, n+1 is output as the output data.

A latch circuit 15 is similar to the latch circuit 13 and latches the output of the ROM 14.

Reference numeral 16 denotes a well-known parallel/serial (P/S) converter consisting of a shift register or the like which uses an output of the clock generator 18 as a read clock of serial data. The P/S converter 16 has an output terminal 20.

In the foregoing arrangement, the counter 12 starts to count a clock c in response to the trailing edge of "1" of the input recording code. The count value of the counter 12 is latched when the signal d is generated from the AND circuit 17. The latched value coincides with the number of codes 0. In order to equalize the time widths of codes 1 and 0, assuming that the number of codes 0 is n, it is sufficient to set T' as follows:

$$T' = \frac{n+1}{2} \cdot T \quad (2)$$

Therefore, the value (n+1) which is obtained by adding "1" to the latched value is soon output from the ROM 14. The value (n+1) is immediately latched by the latch 15.

An output of the latch circuit 15 is converted into a serial data train by the P/S converter 16. The clock to determine the reading rate of the serial output data is the output b of the clock generator 18 and its frequency is twice as high as that of the clock c of the counter 12. Therefore, the time width of the serial data read out of the P/S converter 16 is (n+1)/2. This means that this time width is compressed into ½ of that of the data rate of the input recording code.

Figure 10E:
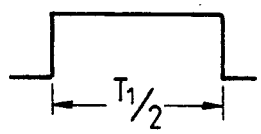

Therefore, as shown in FIG. 10E, a time width pulse T' of ½ of the interval between the input recording codes "1" and "1" can be generated as an output of the output terminal 20.

Figure 11:
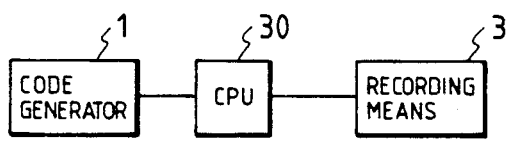
FIG. 11 is a block diagram showing an arrangement of the invention.

On the other hand, in an arrangement shown in FIG. 11, the duty factor 50% can be also obtained by executing a program shown in the flowchart of FIG. 12. A CPU 30 has therein a ROM in which the program is stored, a RAM, a counter, and the like. The CPU 30 receives the RLL encoded recording code (step S1) and detects code 1 (step S2). When code 1 is detected, the counter in the CPU 30 is made operative to start counting (step S3). The counting operation is continued until the next code 1 is detected (steps S4 and S5). The counter counts the pulses in the CPU. When the next code 1 is detected, the count value of the counter at this time is fetched and the counter is reset, thereby obtaining a time width $T_1$ between successive codes 1 (step S6). To output pulses of the time width T', a level "1" signal is output and the counting is started (step S7). The counting operation is continued until a time equal to $T_1/2$ elapses (steps S8 and S9). When clocks of a number corresponding to $T_1/2$ are counted, the output of the level "1" signal is stopped, the counter is reset and the counting operation is stopped (step S9). Thus, the recording code of a duty factor 50% is obtained. The foregoing processes are repeated until the conversion of all of the input recording codes is completed (step S10).

As mentioned above, in the system for recording the RLL codes in accordance with the NRZL rule, the recording error rate can be certainly reduced. In other words, there is an advantage such that in the case of the same error rate, the recording density can be certainly improved.

Table 1 shows an example of conversion into the RLL codes. This example relates to the case where d=5 and n=6. The left side in the table denotes the original data and the right side indicates the RLL code.

TABLE 1

| (00) | 100000 |
|---|---|
| (0100) | 010000000000 |
| (0101) | 001000000000 |
| (0110) | 000100000000 |
| (0111) | 000010000000 |
| (1000) | 000001000000 |
| (1001) | 000000100000 |
| (101000) | 010000010000000000 |
| (101001) | 010000001000000000 |
| (101010) | 010000000100000000 |
| (101011) | 010000000010000000 |
| (101100) | 010000000001000000 |
| (101101) | 001000000100000000 |
| (101110) | 001000000010000000 |
| (101111) | 001000000001000000 |
| (110000) | 001000000001000000 |
| (110001) | 000100000100000000 |
| (110010) | 000100000010000000 |

TABLE 1-continued

| (110011) | 000100000001000000 |
|---|---|
| (110100) | 000010000010000000 |
| (110101) | 000010000001000000 |
| (110110) | 000001000001000000 |

I claim:

1. A digital data recording method whereby digital data encoded by an encoding system in which code "1" does not occur twice without an intervening code "0" and run length of the code "0" is limited is recorded on a recording medium and the code "1" is converted into one pulse and recorded on the recording medium, said method comprising the steps of:
   inputting the digital data;
   converting a first pulsewidth of a pulse corresponding to code "1" in the digital data input in said inputting step, into a second pulsewidth larger than the first pulsewidth; and
   recording the digital data in which code "1" has the second pulsewidth on the recording medium,
   wherein, in said converting step, an amount by which the second pulsewidth differs from the first pulsewidth is selected in accordance with the minimum number of codes "0" required to exist between two consecutive codes "1" in the digital data defined by said encoding system.

2. A method according to claim 1, wherein said encoding system is a Run Length Limited encoding system.

3. A method according to claim 2, wherein, in said recording step, the Run Length Limited encoded digital data is recorded in accordance with an NRZ (Non Return to Zero) rule.

4. A method according to claim 1, wherein, in the recording step, the digital data is recorded by irradiating light on the recording medium.

5. A method according to claim 4, wherein, in said recording step, the light is irradiated as a pulse correspond to said code "1".

6. A method according to claim 1, wherein, in said converting step, a pulsewidth of code "1" is converted so that a pulsewidth of code "0" in the digital data does not become smaller than the pulsewidth of code "1".

7. A digital data recording method whereby digital data encoded by an encoding system in which code "1" does not occur twice without an intervening code "0" and run length of the code "0" is limited is recorded on a recording medium and the code "1" is converted into one pulse and recorded on the recording medium, said method comprising the steps of:
   inputting the digital data;
   converting a first pulsewidth of a pulse corresponding to code "1" in the digital data input in said inputting step, into a second pulsewidth larger than the first pulsewidth; and
   recording the digital data in which code "1" has the second pulsewidth on the recording medium,
   wherein, in said converting step, an amount by which the second pulse-width exceeds the first pulsewidth is selected in accordance with the number of codes "0" between consecutive codes "1" in the digital data.

8. A method according to claim 7, wherein, in said converting step, a first pulsewidth, corresponding to code "1" is converted into approximately one-half of an interval between leading edges of pulses corresponding to consecutive codes "1".

9. A method according to claim 8, wherein said encoding system is a Run Length Limited encoding system.

10. A method according to claim 9, wherein, in said recording step, the Run Length Limited encoded digital data is recorded in accordance with an NRZ (Non Return to Zero) rule.

11. A method according to claim 8, wherein, in said recording step, the digital data is recorded by irradiating light on the recording medium.

12. A method according to claim 11, wherein, in said recording step, the light is irradiated as a pulse for each code "1".

* * * * *

UNITED STATES PATENT AND TRADEMARK OFFICE
CERTIFICATE OF CORRECTION

PATENT NO. : 5,172,359
DATED : December 15, 1992
INVENTOR(S) : HIDEAKI SATO

It is certified that error appears in the above-identified patent and that said Letters Patent is hereby corrected as shown below:

COLUMN 3

Line 52, "discriminated" should read --discriminated,--.

COLUMN 4

Line 18, "a" should read --as--.

COLUMN 6

Line 36, "the" should read --said--.
Line 40, "pulse" should read --pulse to--.

Signed and Sealed this

Eighteenth Day of January, 1994

Attest:

BRUCE LEHMAN

*Attesting Officer*      *Commissioner of Patents and Trademarks*